Feb. 13, 1945.  D. E. LUCID  2,369,583
METHOD OF MAKING ARCUATE MOLDED ARTICLES
Filed Dec. 27, 1943
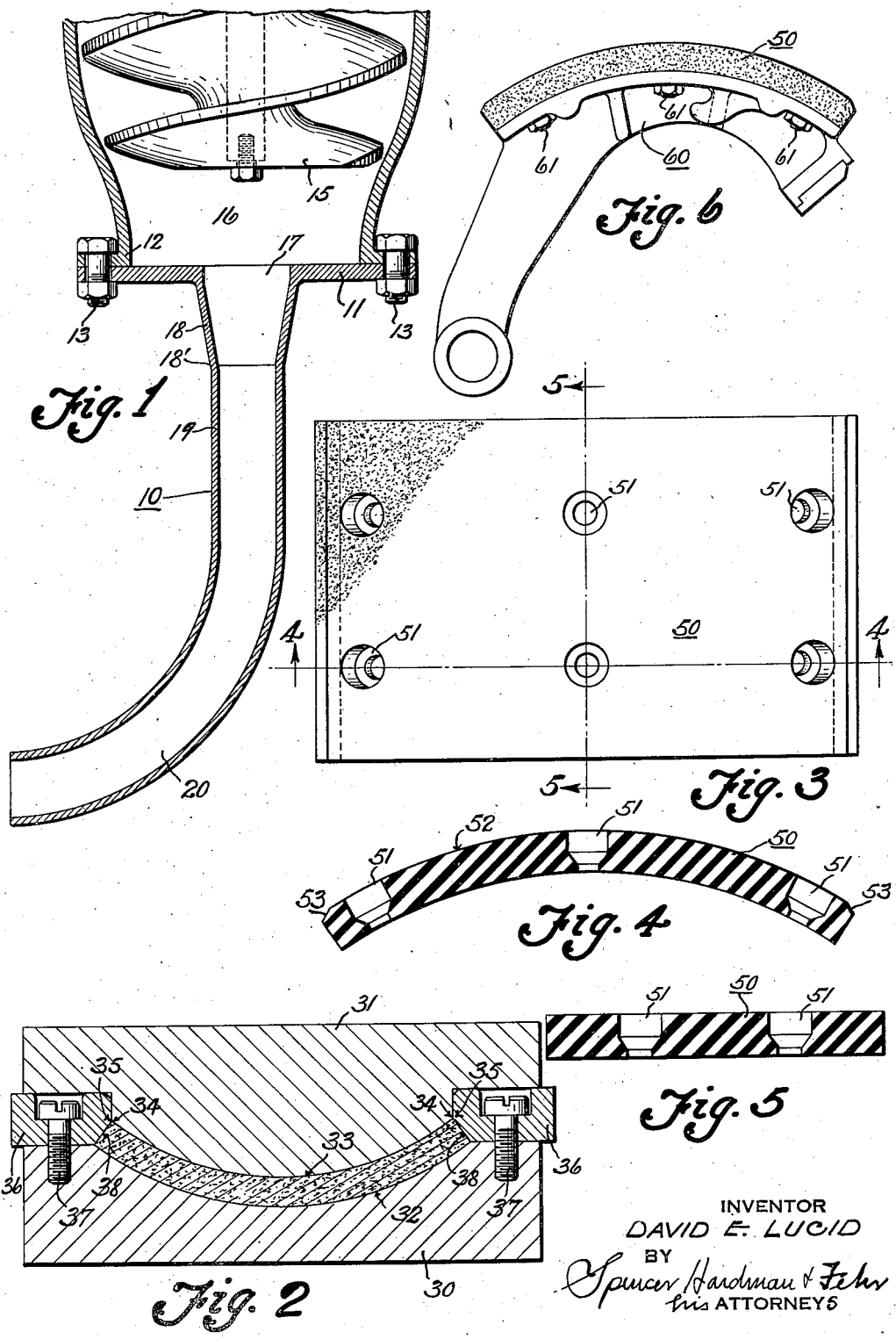
INVENTOR
DAVID E. LUCID
BY
Spencer Hardman & Fehr
his ATTORNEYS Patented Feb. 13, 1945

2,369,583

UNITED STATES PATENT OFFICE 2,369,583

METHOD OF MAKING ARCUATE MOLDED ARTICLES

David E. Lucid, Dayton, Ohio, assignor to General Motors Corporation, Detroit, Mich., a corporation of Delaware Application December 27, 1943, Serial No. 515,636

6 Claims. (Cl. 18—55)

This invention relates to a method of making molded arcuate-shaped articles of substantial radial thickness from a thermosetting plastic compound, such for example, as molded friction brake blocks which are adapted to be fixed to the brake shoes on the wheel brakes of automotive trucks or buses, etc.

In my prior application Ser. No. 508,952, filed November 4, 1943, I have disclosed a method of extruding and then molding brake linings for automobiles. Since brake linings for passenger automobiles ordinarily have such a small radial thickness relative to their radius, they can be first extruded in a straight flat form and subsequently bent over to the desired curvature without difficulty and without causing too much tension and/or cracks in the extruded blank at its outer surface, or too much compression and/or crinkles in same at its inner surface. However such difficulties do arise in the case of the relatively thick brake linings (or "brake blocks" as they are usually termed) used in trucks or other large automotive vehicles.

Hence an object of this invention is to provide an improved method of making such relatively thick arcuate-shaped molded brake blocks, or other curved molded articles, which have such relative radial thickness that the above-mentioned difficulties arise.

A more specific object of this invention is to provide a method of extruding an unshaped thermosetting plastic compound and simultaneously forming it directly into an arcuate-shaped blank of such radial thickness that the length of arc of its outer surface is materially greater than the corresponding length of arc of its inner surface. Such relatively thick arcuate blanks ordinarily cannot be first extruded in straight form and then bent to the desired curved form without running into serious trouble of various kinds, such for instance, as stretching the outer layer too much and causing radial cracks therein, or compressing the inner layer too much and causing it to wrinkle up. In any event, if there be any fibrous material, such as asbestos fibers, in the plastic material the fibers in the outer layers will be stretched and/or broken up into shorter lengths and at least be disposed in the plastic material quite differently from the fibers in the inner layers of such a bent arcuate blank. Therefore an important advantage of the method of this invention is the provision of an extruded arcuate-shaped blank which has highly uniform characteristics both at its inner and outer peripheries and which will result in a strong molded article having characteristics which can be uniformly predicted in advance.

Further objects and advantages of the present invention will be apparent from the following description, reference being had to the accompanying drawing wherein a preferred embodiment of the present invention is clearly shown.

In the drawing:

Fig. 1 is a section thru the curved extruding nozzle and a portion of the extruding machine, which may be used with this invention.

Fig. 2 illustrates a mold of the follow-up type being used for molding and curing the curved preform obtained from the extrusion machine of Fig. 1.

Fig. 3 is a face view of the final brake block made according to this invention.

Fig. 4 is a section on line 4—4 of Fig. 3.

Fig. 5 is a section on line 5—5 of Fig. 3.

Fig. 6 is a view showing a truck brake shoe complete with the brake block of Figs. 3 to 5 bolted in place thereon.

Similar reference characters refer to similar parts throughout the several views.

Numeral 10 designates the curved extruding nozzle or forming die which is provided with an end plate 11 which is bolted directly to the extruder head 12 by bolts 13. The plastic material is put in the hopper of the extruder in the usual manner and is forced by the extruder screw 15 at high pressure into the end chamber 16 and thence directly into the entrance 17 of the extruding nozzle 10. The radius and the cross-section dimensions of the curved portion 20 of nozzle 10 are preferably constant and correspond to the desired radius and cross section of the curved blank to be extruded. The straight portion 19 also preferably has the same cross section dimensions as the extruded blank. The tapered portion 18 changes the sectional dimensions of the opening 17 to the desired sectional dimensions of straight portion 19. As illustrative of practicable relative dimensions the following is given. To extrude a curved blank having a section 2" thick and 12¾" wide, the inside dimensions of portions 19 and 20 are 2" x 12¾" wide. Entrance opening 17 at the extruder head may then be about 3" x 8" wide, and tapered portion 18 changes these sectional dimensions to 2" x 12¾" wide at the point 18'. The straight portion 19 preferably is about 10" long, but may be much shorter or even eliminated altogether in some cases in order to facilitate the passage of the compacted material thru nozzle 10. The inner radius of curved portion 20 corresponds approximately to the desired inner radius of the extruded curved blank and in the case illustrated in the drawing is about 8 inches.

The extruded material emerges from nozzle 10 in curved form in a continuous length and is quickly cut off by radial cuts into arcuate-shaped blanks of desired length as the extruded length moves slowly along. Figs. 2 and 4 illustrate a typical brake block having an arc of about 72°, hence when extruding curved blanks for making this particular brake block the blanks should be cut off into corresponding arcs of about 72° each. These emerging arcuate blanks are ordinarily too pliant to be completely self-supporting and hence are received and supported by suitable similarly-curved portable drying pans positioned on either the inside radius or outside radius of the emerging blank, depending on the direction relative to the vertical in which nozzle 10 is turned. Fig. 1 shows nozzle 10 turned in a horizontal direction so that the blank emerging therefrom curves upwardly, in which case the supporting pan or roller will be located on the inside radius of the arcuate blank. However, if desired, nozzle 10 may be turned so that its exit end is turned straight down, or straight up, or at any desired angle to the vertical. Also the entire nozzle 10 may extend horizontally so that the weight of the emerging curved blank can be initially supported by a flat plate underlying its lower edge. In any case, the arcuate blanks are placed upon correspondingly curved portable drying pans and carried from the extruder and placed in a drying oven where they are dried at such temperature and for such time period as will materially stiffen or strengthen the curved blanks and render them entirely self-supporting and suitable for use as preforms to be inserted in similarly-shaped cavities in curing molds. However the drying temperature should not be high enough to partially cure or set up any thermosetting binder in the compound, as will be readily understood.

Fig. 2 illustrates the step of compacting and curing the dried curved preform in a follow-up mold having lower and upper halves 30 and 31. The lower surface 32 of the mold cavity is arcuate and its radius is the same as the outer radius of the molded block. The upper arcuate surface 33 similarly has the inner radius desired in the molded block, and the annular space between arcuate surfaces 32 and 33 at the limit of closing movement of the mold determines the radial thickness of the molded block. Fig. 2 shows the mold closed to its stopped limit of closing movement, in which closed position the end points 34 of arcuate surface 33 are closely adjacent the points 35 on the plates 36 which are removably fixed to the lower half 30 by screws 37. The surfaces 38 on plates 36 preferably extend radially with respect to arcuate surfaces 32 and 33 and hence will accurately mold the radial end surfaces on the finally molded block.

The above-mentioned curved preform is first inserted in the lower half of the mold cavity, and preferably quite accurately fits same both as to curvature and length in order to avoid any substantial bending thereof or lengthwise flow of the material while it is being compacted and molded to its final thickness. Thus the radial thickness of the preform may be reduced by as much as one-half, or even more, when the mold halves 30 and 31 are closed to the position shown in Fig. 2 and still there will be no lengthwise flow within the material at or near the outer layers of the molded block and practically no lengthwise flow within the material anywhere except perhaps a very slight flow at the very tips of the inner layers thereof. Hence with this method of molding arcuate blocks the material of the preform is simply compacted radially and any fibers distributed thruout the material are not broken up by stretching or wrinkled up by compressing same, and the uniformity of the material is not otherwise disturbed by any substantial lengthwise flow within the body of the material. After molding under such heat and pressure and time period as will at least partially cure and permanently set the thermosetting binder in the material, the mold halves 30 and 31 are separated and the now fully molded block removed therefrom. In the form of mold shown in Fig. 2, one of the plates 36 must be removed or at least loosened by removing screw 37. Of course if desired, an automatic mold may be provided wherein one or both of the plates 36 will move laterally outward as the mold halves 30 and 31 move vertically apart, and also will move laterally inwardly to positions shown in Fig. 2 after the next preform is inserted in place in the mold cavity and before upper half 31 of the mold begins to radially compact the material. Such automatic molds are well known and need no further description here.

In cases where a thermosetting resin is used as the binder in the compound, after the molded blocks are removed from the molds they are usually baked in an oven at such temperature and time period as will complete the cure of the thermosetting materials therein to the desired degree and thereby impart to the molded blocks the optimum characteristics for their intended uses.

Figs. 3, 4, and 5 illustrate a typical molded brake shoe block 50 made according to this invention after it has been given any desired finishing operations such as finish grinding of its wearing surface 52, drilling and counterboring the bolt holes 51, and chamfering of its ends as at 53. Fig. 6 shows the brake block 50 rigidly fixed to the brake shoe 60 by bolts 61 whose heads fit snugly deep within the counterbores of bolt holes 51 shown in Figs. 4 and 5.

The principles of this invention may be advantageously employed with many extrudable plastic compounds and particularly those having asbestos or other fibrous material therein such, for example, as the various extrudable thermosetting compounds described in my said prior application Ser. No. 508,952, or such as any extrudable compound described in my prior application Ser. No. 508,951, filed November 4, 1943. There are many other well-known extrudable compounds adapted to be used according to the principles of this invention and which contain phenol-formaldehyde resins or other thermosetting resins as the chief binder ingredient in the compound, or natural or synthetic rubber, or both rubber and thermosetting resin as the binder ingredient. In any case, the temperature, molding pressure, and time period of molding the curved preforms should obviously conform to the requirements of the particular compound being used. Anyone skilled in the art can readily determine the suitable molding conditions for the particular compound being used, that is, the molding temperature, pressure, and time period required for optimum results. Obviously the curved extruding nozzle may be used to form curved preforms of various cross sections, for example, round, half-round, square, or any other desired section.

While the embodiment of the present invention as herein disclosed, constitutes a preferred form, it is to be understood that other forms might be adopted, all coming within the scope of the claims which follow.

What is claimed is as follows:

1. The steps in the method of making a molded curved article having a substantial radial thickness from a plastic compound, comprising: extruding the plastic compound under high pressure thru a curved extruding nozzle curved in the direction of flow of the extruded material in such manner as to form a curved pliant blank having a peripherally extending grain and uniform characteristics throughout its radial thickness, drying said curved pliant blank while supporting it against deformation so as to maintain it substantially in its extruded curved form until it stiffens into a self-sustaining curved preform suitable for insertion in a mold cavity, then inserting said self-sustaining curved preform in a follow-up mold having a correspondingly-shaped curved molding cavity and compacting the material thereof radially but without substantial change in its curvature.

2. The steps in the method of molding an arcuate-shaped article having a substantial radial thickness from a thermosetting plastic compound, comprising: forcing the unshaped plastic compound thru a longitudinally curved extruding nozzle and thereby forming an extruded blank curved in direction of extrusion and having a radius approximately that desired in the final molded article, drying said curved blank while supporting it against substantial deformation from its extruded curvature and thereby providing an arcuate-shaped preform suitable for insertion in a curing mold, then inserting said preform in an approximately correspondingly-shaped cavity in a curing mold and radially compacting and curing same under heat and pressure, whereby the material is finally compacted and set with approximately the same curvature given it during extrusion.

3. The steps in the method of molding an arcuate-shaped article having a substantial radial thickness from a thermosetting plastic compound, comprising: forcing the unshaped plastic compound thru a longitudinally curved extruding nozzle and thereby forming an arcuate-shaped blank curved in the direction of flow during extrusion, supporting said blank so as to maintain its arcuate shape until it becomes self-sustaining, then inserting said arcuate blank as a preform in an approximately correspondingly-shaped cavity in a curing mold and radially compacting and hardening same under heat and pressure.

4. The steps in the method of molding an arcuate-shaped article having a substantial radial thickness from a thermosetting plastic compound, comprising: forcing the unshaped plastic compound thru a longitudinally curved extruding nozzle and thereby forming a progressively curved blank having a radius approximately that desired in the final molded article and having uniform grain characteristics thruout its radial thickness, and subsequently molding and curing under heat and pressure said curved blank without at any time materially distorting its general original curvature, whereby the material is finally compacted and set substantially with the same general curvature as given it during extrusion.

5. The steps in the method of making a curviform brake block from a fibrous thermosetting plastic friction compound, comprising: forcing the unshaped plastic compound thru a longitudinally curved extruding nozzle and thereby forming a curvi-form blank curved in the direction of flow during extrusion and having its fibrous grain extending approximately in the same curvature desired in the final brake block, drying said extruded blank while supporting it so as to approximately maintain its extruded curvature and thereby providing a self-sustaining preform suitable for insertion in a curing mold, inserting said preform in a correspondingly curved cavity in a curing mold and radially compacting and curing same under heat and pressure, whereby the fibrous material is finally compacted and set without elongating or shortening the fibrous grain thereof as provided by the extrusion step.

6. The steps in the method of making a curviform brake block from a fibrous thermosetting plastic compound, comprising: forcing the unshaped plastic compound thru an elongated extruding nozzle curved in direction of flow of the extruded material and thereby forming a curviform blank having its fibrous grain directly extruded into approximately the same curvature desired in the final brake block, and subsequently molding and curing said blank without at any time materially distorting the extruded curvature thereof, whereby the fibrous compound is finally compacted and set without substantial lengthwise flow of the fibrous material after extrusion thereof.

DAVID E. LUCID.